UNITED STATES PATENT OFFICE.

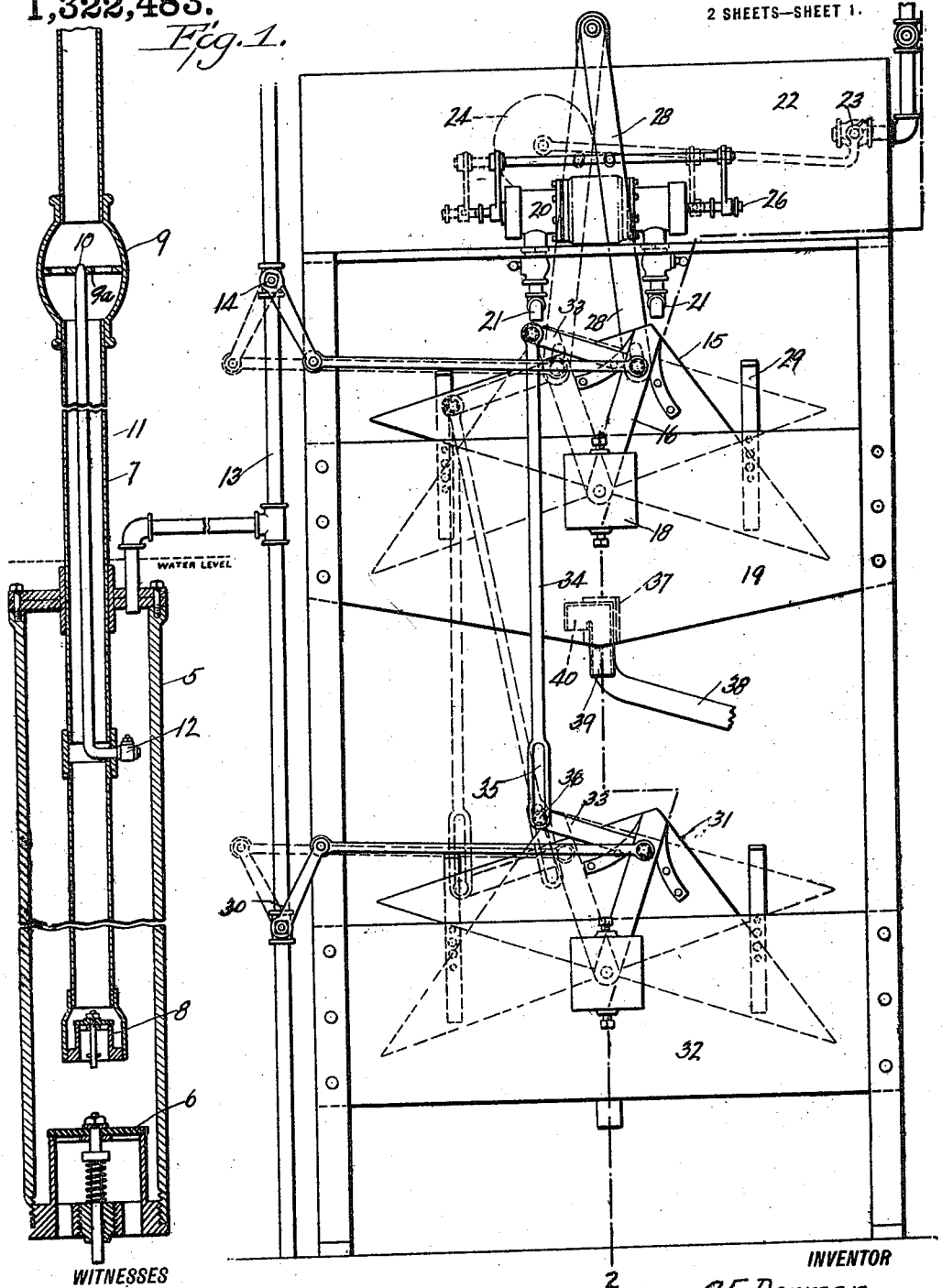

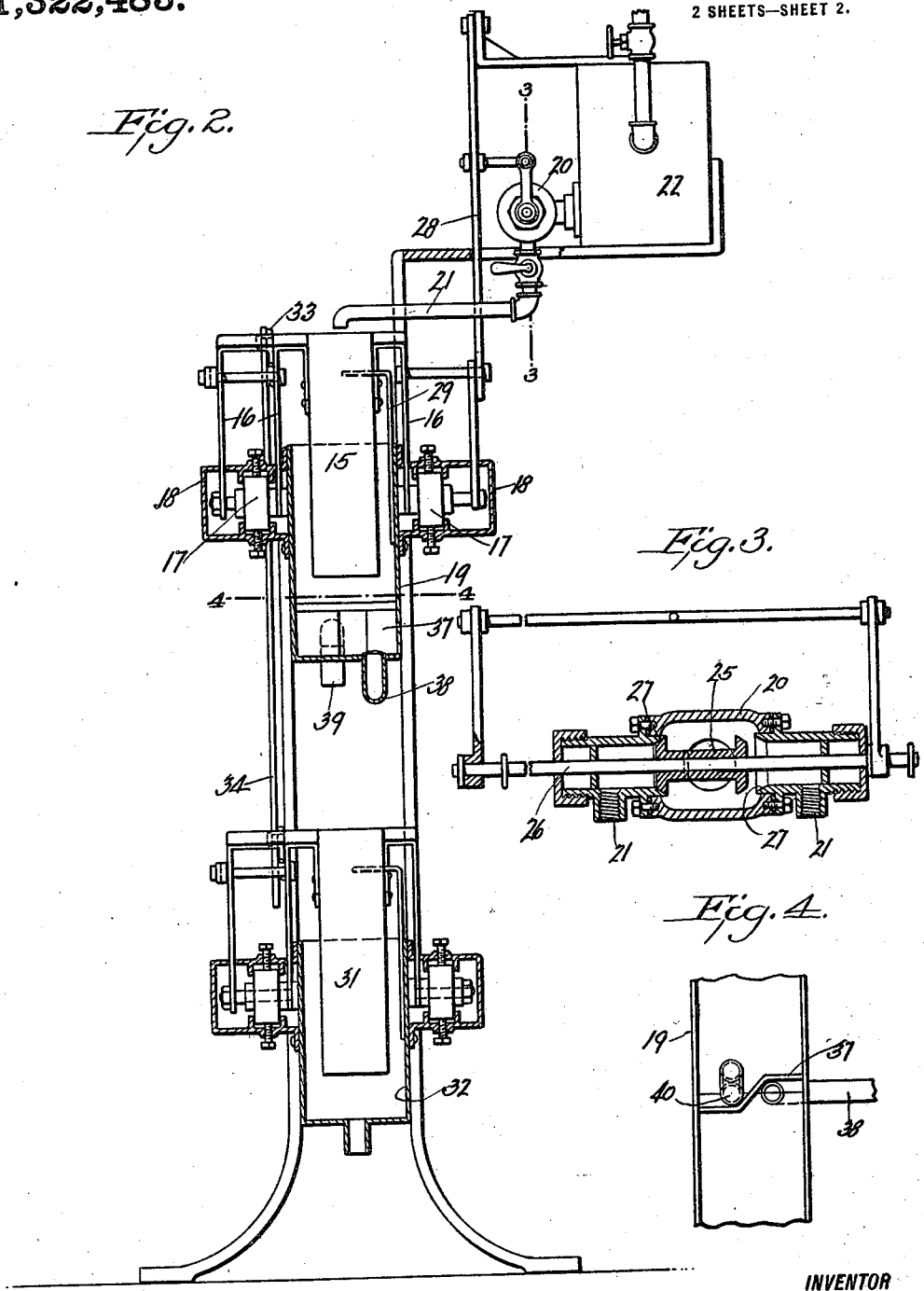

GEORGE E. DENMAN, OF FRUITVALE, CALIFORNIA.

PUMP.

1,322,483. Specification of Letters Patent. Patented Nov. 18, 1919.

Application filed February 1, 1918. Serial No. 214,896.

*To all whom it may concern:*

Be it known that I, GEORGE E. DENMAN, a citizen of the United States, and a resident of Fruitvale, in the county of Alameda and State of California, have invented a new and Improved Pump, of which the following is a full, clear, and exact description.

My invention relates to pumps of the air lift type, and an object of the invention is to provide a simple, efficient and inexpensive pump.

Another object of the invention is to provide an air lift pump in which the air supplied is controlled automatically by a trip mechanism actuated by an intermittent water flow, also automatically operated by the same trip mechanism.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a section through the pump and an elevation of the trip mechanism controlling the operation of the pump;

Fig. 2 is a section on line 2—2, Fig. 1;

Fig. 3 is a section on line 3—3, Fig. 2; and

Fig. 4 is a section on line 4—4, Fig. 2.

Referring to the drawings, 5 is a cylinder which is adapted to be submerged so that the top of same is slightly below the water level, as shown in Fig. 1. It has a valve 6 at the bottom which controls the inflow of water from the valve into the cylinder. An outlet conduit 7 projects through the top of the cylinder, a portion of same extending from the top to substantially the bottom of the cylinder whereat a valve 8 is provided which checks the flow from the outlet conduit into the cylinder. The outlet conduit 7 has an enlarged section 9 at a suitable distance above the cylinder into which the reduced end 10 of an ejector conduit 11 extends. The end 10 of the conduit 11 is held centrally in the section 9 by the apertured member 9ᵃ. The said conduit 11 extends within the outlet conduit 7 and enters the cylinder 5 below the top but above the valve 8 of the outlet conduit. The conduit 11 is provided with a check valve 12 which checks the inflow from the ejector conduit 11 into the cylinder.

An air supply conduit 13 is connected to the top of the cylinder to discharge air thereinto. The conduit is provided with a valve 14 which is alternately opened and closed by a trip box 15. The trip box has arms 16 extending along each side which are secured at the top of the box and which bear with their lower ends in boxes 17 housed in extensions 18 of the tank 19 provided under the box 15. As will be seen from Fig. 1, the trip box 15 in elevation has the shape of an isosceles triangle. The axis of oscillation of the box is at the base and, therefore, below the center of gravity of the box. To each of the sloping faces of the box a water jet may be directed from the valve 20 disposed above the trip box and presenting two discharge conduits 21, one for each of the sloping faces.

The valve 20 is connected to a tank 22 the water in which is maintained at a predetermined level by means of a valve 23 operable by a float 24. The flow from the tank to the conduits 21 through the valve 20 is controlled by a valve 25 mounted on a shaft 26 slidably mounted in the valve 20. The casing of the valve 20 presents suitable valve seats 27 for the valve 25 so as to bring into communication either of the conduits 21 with the tank while the other conduit is cut off. The shaft 26 is operated by a lever 28 which is actuated by the trip box 15 (see Fig. 1). The displacement of the trip box on its axis is limited by stays 29 rising from the tank 19.

As shown in Fig. 1 the valve 20 is in a position so that water can flow from the tank through the left conduit 21. In consequence, the trip box, under the influence of the falling water, will oscillate on its axis to the position shown in dotted line. In the movement of the box the lever 28 displaces the valve 25, thereby cutting off the flow from the left-hand conduit 21 and opening to the right-hand conduit 21, thereby reversing the movement of the box. Since the valve 14 is connected to the trip box it will open and close during the oscillatory movement of the box. As shown in full lines in Fig. 1, the valve 14 is open. The dotted position of the same figure shows the valve closed.

The air outlet from the cylinder 5 is controlled by a valve 30 which is operable by a trip box 31 identical with the trip box 15 and similarly mounted above a tank 32. The trip box 31 is disposed below the tank 19 so that the water from said tank may discharge on to the trip box 31 to operate the same. The trip boxes 15 and 31 each have an arm 33 constrained to move with the box. The two arms are connected by a rod 34. The rod 34 has a slot 35 so that the same has a movement relative to the arm 33 of the box 31. The slot is long enough to allow an oscillation of the upper trip box 15 without causing the lower trip box 31 to oscillate. As the upper trip box 15 is oscillated from the position shown in full line to that shown in dotted line in Fig. 1, the lower box remains in the position shown in full lines in Fig. 1. The lower box is caused to operate by water discharged from the tank 19 falling upon the box 31. This causes the box 31 to oscillate and thereby the pivot 36 on the lower arm 33 is brought against the lower end of the slot 35. The subsequent operation of the upper trip box 15 from the position shown in dotted line to that shown in full line will also carry therewith the lower trip box 31 to the position shown in full line. When the lower trip box 31 is in the position shown in full line, the valve 30 is in closed position. When it is in the position shown in dotted lines in Fig. 1, the valve is in open position. It will therefore be noted that when the valve 14 is closed, the valve 30 is not opened immediately, thus the air forced into the cylinder 5 is allowed to do its work by expansion before it is exhausted from the cylinder through the valve 30.

To properly time the operation of the trip box 31 relative to the trip box 15, a partition 37 is provided within the tank 19 which divides the tank into right and left-hand sections, the right-hand section having a discharge at 38 leading to the sewer. The left-hand section of the tank has a discharge conduit 39 which discharges on to the trip box 31. To prevent the immediate effect of the water falling into the left-hand section of the tank 19, a siphoning head 40 is provided on the conduit 39.

The provision of a check valve 12 on the ejector conduit 11 checks water from dropping back into the pump cylinder when the air is exhausted and, therefore, reduces slippage. Furthermore, it requires a lower initial pressure to start the upward flow of water, due to the fact that a certain portion of the water is being prevented from dropping by the check valve 12, and, therefore, no effort is necessary again to raise that part of the water. Experiments have shown that with the check valve the pump can be worked with forty pounds pressure, in place of sixty-nine without the check valve.

I claim:

1. In combination with an air-lift pump having an air inlet and an air outlet, a tripping mechanism connected to the air inlet, a tripping mechanism disposed below the first mentioned tripping mechanism and connected to the air outlet, means for supplying water jets to the first tripping mechanism, means for controlling said jet-supplying means operable by the first tripping mechanism, and means between the first and second tripping mechanisms adapted to accumulate the water from the jets to the first tripping mechanism and operate the second tripping mechanism.

2. In combination with an air-lift pump having an air inlet and an air outlet, a tripping mechanism for operating the air inlet, a second tripping mechanism below the first tripping mechanism for operating the air outlet, a tank below the first tripping mechanism having means for discharging on to the second tripping mechanism, a pair of conduits adapted to discharge water on the first tripping mechanism whereby the same is operated, a valve for supplying water to either of the conduits, a lever for operating said valve connected to the first tripping mechanism, and means connecting the two tripping mechanisms so that the upper one will operate the lower one when moving in one direction but not when moving in the opposite direction.

3. In combination with an air-lift pump having an air inlet and an air outlet, a tripping mechanism for operating the inlet, a pair of conduits adapted to discharge water on the tripping mechanism, a tank having compartments for receiving the water from each of the conduits, a second tripping mechanism below the tank, means in one of the compartments for discharging water on to the second tripping mechanism, a valve for said pair of conduits, a lever for operating said valve so that the water is switched from one to the other conduit, said lever being operable by the first tripping mechanism, and means connecting the two tripping mechanisms so that the upper one will operate the lower one in one direction only, the said lower one being operated in the other direction by the water from the compartment having a conduit to discharge on to the second tripping mechanism.

4. In combination with an air-lift pump having an air inlet and an air outlet, a tripping box mounted to oscillate, said tripping box presenting a pair of sloping sides, a conduit for discharging water on to each of the sloping sides, a valve for said conduits, a lever for operating said valve to discharge successively through said conduits, said lever being operable by said box, a lever connecting the tripping box to the air inlet, a second tripping box of similar construction to the first, a lever connecting said second box to the air outlet, means connecting the two boxes so that the upper one will operate the lower one when moving in one direction only and means for accumulating the water coming from one of said conduits to the first box and discharge it on to the other box to operate said box in the other direction.

5. In combination with an air-lift pump having an air inlet and an air outlet, a tripping mechanism for operating the air inlet, means for supplying water jets to the tripping mechanism for operating the same, a valve controlling the jets operable by the movement of the tripping mechanism, a second tripping mechanism disposed below the first for operating the air outlet, an arm constrained to move with each of said tripping mechanisms, a rod connecting said arms, said rod having a slot which is engaged by the arm of the lower tripping mechanism whereby said lower tripping mechanism is operated by the upper tripping mechanism in one direction only, and means for accumulating the water discharged by the jets on to the first tripping mechanism and discharging it on to the second tripping mechanism, whereby said second tripping mechanism is operated in the other direction.

GEORGE E. DENMAN.